Nov. 30, 1948.  F. H. OWENS  2,455,187
PHOTOGRAPHIC FILM MAGAZINE
Filed Sept. 24, 1943  2 Sheets-Sheet 1
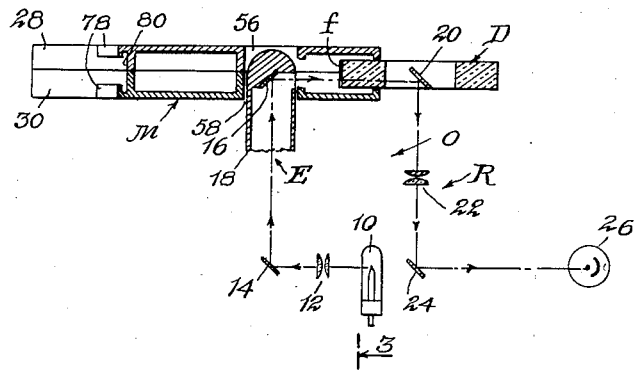
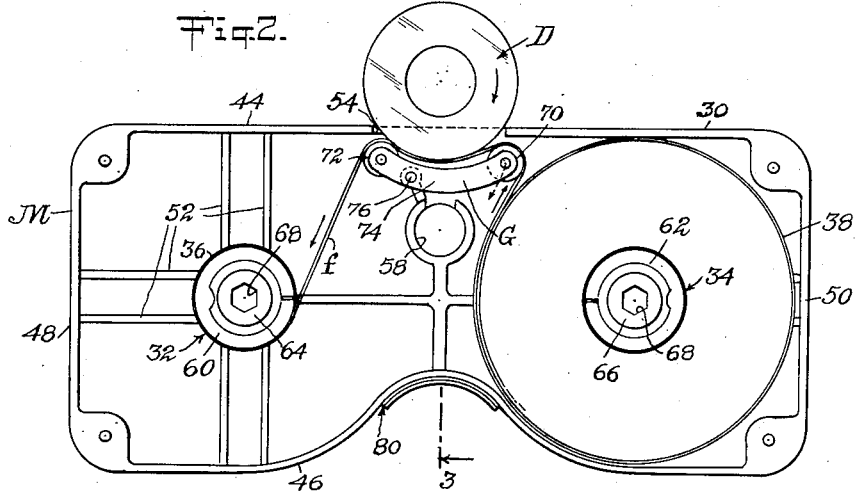
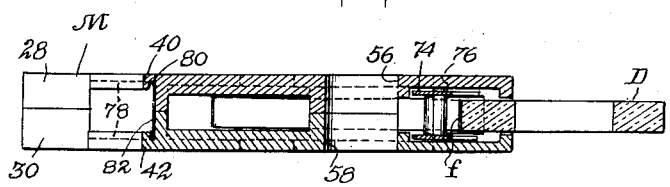
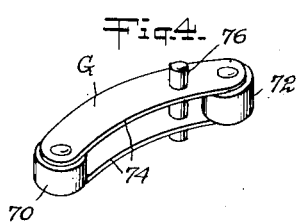 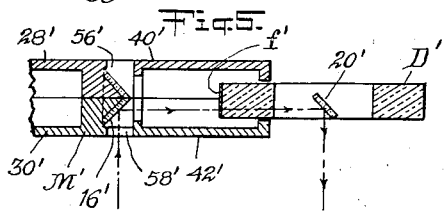
INVENTOR.
Freeman H. Owens
BY James & Franklin
Attorneys Nov. 30, 1948.    F. H. OWENS    2,455,187
PHOTOGRAPHIC FILM MAGAZINE
Filed Sept. 24, 1943    2 Sheets-Sheet 2
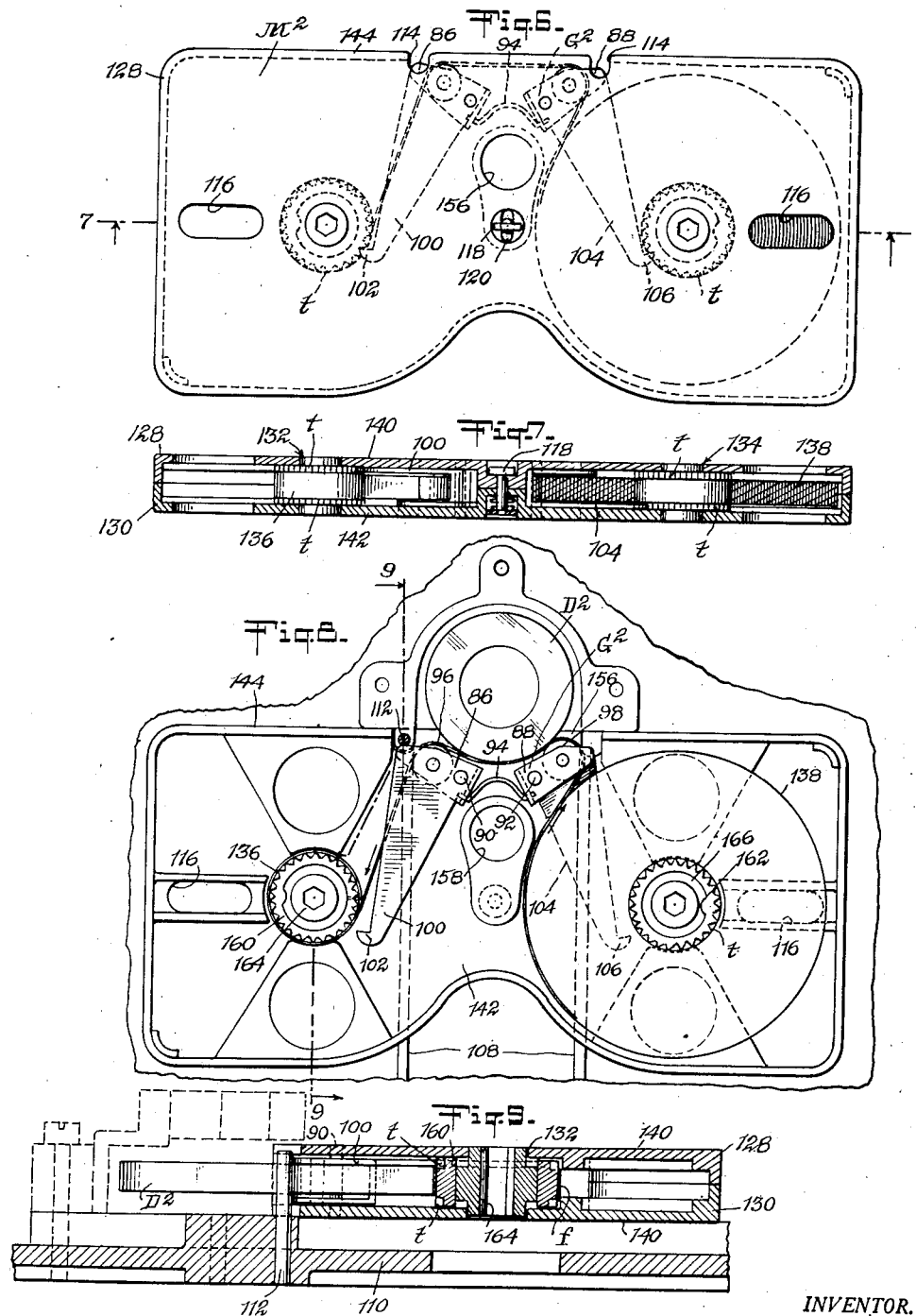
INVENTOR.
Freeman H. Owens
BY
James + Franklin
Attorneys Patented Nov. 30, 1948

2,455,187

UNITED STATES PATENT OFFICE 2,455,187

PHOTOGRAPHIC FILM MAGAZINE

Freeman H. Owens, New York, N. Y.

Application September 24, 1943, Serial No. 503,650

12 Claims. (Cl. 179—100.3)

This invention relates to a photographic film such as a sound film magazine.

In my copending application Serial No. 494,605, filed July 14, 1943, on "Disc record and film record phonograph reproducer," there is disclosed a sound record reproducing machine especially designed for use in the home adapted for operation with sound records on photographic film. The film sound records are contained in magazines which, handled like ordinary disc records, are removably placeable in the machine for a playing operation. The reproducer embodies in its construction driving means for the film and an optical system for translating the photographic sound record on the film. The magazine is so constructed that, itself devoid of any driving elements, when merely placed as by being slid into the reproducer it operably combines with the film driving means and the optical system in such a way that it is ready for a playing operation. The magazine is preferably adapted to be used with a reel of film having two parallel sound tracks or records arranged longitudinally of the film, and the magazine is constructed so as to be reversible, that is, so that it may be used first in one position and then in its reversed position, thus avoiding the necessity of rewinding the film.

The prime object of my present invention centers about the provision of a novel film magazine of this character especially adapted for the home reproducer described and claimed in said copending application.

To the accomplishment of this main object and such other objects as may hereinafter appear, my present invention relates to the magazine combination and sub-combination as sought to be defined in the appended claims and as described in the accompanying specification taken together with the drawings in which:

Fig. 1 is a view somewhat schematic taken in cross-section similar to the view of Fig. 3 and showing the combination which is formed in the reproducer between the magazine of my present invention and the film driving means and optical reproducing means of the reproducer;

Fig. 2 is a plan view of the magazine of the present invention with the cover section thereof removed and showing the same in its relation to the film driving means;

Fig. 3 is a view thereof with cover attached taken in cross-section in the plane of the line 3—3 of Fig. 2;

Fig. 4 is a perspective view of the film guiding means used in the form of the invention shown in Fig. 2;

Fig. 5 is a fragmentary cross-sectional view of a modification particularly showing a modified form of optical system used therewith;

Fig. 6 is a plan view of another modification of the magazine embodying the principles of the present invention;

Fig. 7 is a view of Fig. 6 taken in cross-section in the plane of the line 7—7 of Fig. 6;

Fig. 8 is a plan view of the magazine shown in Fig. 6 with the cover removed and showing the position the magazine assumes when placed in the reproducer; and Fig. 9 is a view thereof taken in cross-section in the planes of the broken line 9—9 of Fig. 8.

Referring now more in detail to the drawings, the improved magazine of the present invention may first be described by reference to Fig. 1 of the drawings which shows the combination which is formed in the reproducer between the magazine, the film driving means therefor and the optical reproducing system therefor. The magazine M containing the sound record film $f$ when placed into the reproducing machine operatively combines with a drive wheel D which is peripherally engaged by the film $f$ and an optical system O comprising an exciter portion E located on one side of the film and a reproducer portion R located on the other side of the film. The drive wheel D itself forms part of the optical system on the reproducer side R thereof and this drive wheel preferably comprises a transparent member such as a glass annulus which is driven by any suitable means and which in the reproducer disclosed in my said copending application, is fixed or secured to the spindle of the turntable of the machine. The drive wheel D and the optical system O thus form part of the reproducing machine; and the film magazine M is so constructed and relatable to these parts of the reproducing machine that it is removably placeable into the combinative condition and position depicted in Fig. 1 of the drawings.

The exciter portion E of the optical system comprises the means for projecting a beam of light towards one side of the film $f$ for transmission through said film and through the transparent drive wheel D. This comprises the source of illumination 10, the condensing lens system 12, the reflector 14 and the reflector 16 arranged in optical sequence. The reflector 16 is mounted in the form of the invention shown in Fig. 1 in a vertically movable tube 18 from an ascended operative position as shown in Fig. 1 of the drawings to a descended position where the tube 18 clears the magazine M. In the operative position depicted in Fig. 1, light is transmitted from the source 18 to and through the film f and the transparent drive wheel D.

The reproducing portion R of the optical system comprises a reflector 20 arranged within as at the center of the drive wheel D, a lens system 22, the reflector 24, and the photo-electric cell 26 all arranged in optical sequence. Thus light transmitted through the film f and the transparent drive wheel D to the center or axis of the drive wheel is reflected and projected so as to become incident upon a photoelectric cell 26, which latter is connected, as is customary in systems of this character, to an amplifying and loud speaker system. The film f preferably contains two parallel sound tracks or records arranged longitudinally thereof. As clearly depicted in Fig. 1 of the drawings, the optical system is so arranged that only the bottom or lower sound record is acted upon by the optical system and is played during a film run; this is clearly indicated by the arrowed lines showing the line of projection of the optical system O. It will be understood that after the playing of the sound record the magazine M is reversed in position, and when replaced into the machine the other sound track will assume the position shown in Fig. 1 for the playing thereof.

The magazine M preferably comprises a split or two-part casing having the top half 28 and the bottom half 30. This casing may be made from any material and may be suitably molded from a plastic into the configuration shown in the drawings. The magazine is shaped to provide spaced mountings generally designated as 32 and 34 for receiving the take-up reel 36 and the supply reel 38 for the film f. The top and bottom half sections of the casing when assembled form the end walls 40 and 42 and the side walls 44, 46, 48 and 50. The interior faces of the end walls may be suitably ribbed as at 52 for strengthening purposes.

The combinative cooperation of the film magazine with the film driving means and the optical system of the reproducer as depicted in Fig. 1 of the drawings is obtained by forming the film magazine in one of its side walls such, for example, as the wall 44 with an opening 54 for receiving the externally mounted drive wheel D, and the film magazine in one of its end walls (or both of its end walls where the magazine is reversible in character) is provided with means such as transparent apertures or registering openings 56 and 58 for permitting light to be transmitted from an external source through said end wall or walls into the magazine casing to be reflected therein and then transmitted through the film f as depicted in Fig. 1. In the form of the invention shown in Figs. 1 to 3, the registering openings 56 and 58 in the end walls 40 and 42 are designed to permit the insertion or reception of the reflector tube 18 so that the excited light may be transmitted into the casing and there reflected at right angles for transmission through the film and the transparent drive wheel as explained.

In the modification shown in Fig. 5 of the drawings, the end walls 40' and 42' of the magazine M' are provided with the registering openings 56' and 58' in which the reflector system 16' is composed of two reflector elements arranged at right angles and meeting at the median plane of the magazine is mounted as a fixed element in the magazine, thus rendering unnecessary the uses of a movable tubular mount such as 18 of Fig. 1. Otherwise the construction shown in Fig. 5 is the same as that shown in Figs. 1 to 3 and the parts are designated by similar but primed reference characters. It will be understood that one of the reflector elements of the reflector 16' is used with one of the sound tracks on the film f' while the other of the reflector elements is used with the other of the sound tracks, the magazine M' of Fig. 5 being thus also a reversible type of magazine.

The reels 36 and 38 include the spools 60 and 62 which are received by the cores 64 and 66, each of which is provided with an irregularly shaped such as a hexagonal opening or bore 68, 68 adapted to receive a driving shank or spindle forming part of the reproducer machine. When the magazine is placed in position, the driving spindle is moved into the bore of the core 64 which is the core for the take-up reel 36), and the take-up reel is thus operated to take up the film f as it is moved in the direction indicated by the arrows in Fig. 2 of the drawings.

The film magazine is provided with a guide means generally designated as G, which functions for guiding the film in its movement from the supply reel 38 to the take-up reel 36 past the opening 54 in the magazine and in engagement with the film driving element D. Said guide means G in the form of the invention shown in Figs. 1 to 4 includes the guide rollers 70 and 72 mounted on a movable lever 74 which lever is movable when the film is driven or to be driven to cause one of the rollers to move towards said driving element D for film driving engagement. The lever 74 may be eccentrically pivoted by means of the pivot pin 76 in the magazine casing. For this construction, when the magazine M is placed in the machine the driving wheel D is received by the side wall opening 54 and moves into engagement with the film f between the guide rollers 70 and 72. Movement of the film f from the supply reel to the take-up reel causes the lever 74 to be moved about its pivot (by the longer arm thereof) causing one of the rollers to move towards the driving element D for firm contact with the film and for film driving engagement. With the parts as shown in Fig. 2 the guide roller 72 will be moved into film driving engagement, and when the magazine is reversed in position the roller 72 then assuming the position of the roller 70 will likewise be moved into film contact and driving engagement.

The magazine M may also be provided with a space for receiving a title bearing card or the like. For this purpose the wall 46 may be formed at its middle with the oppositely directed flanges 78 defining a curved groove 80 which is adapted to receive a card 82 bearing a titular description of the record contents.

The film magazine thus constructed, therefore comprises a unit, itself devoid of any operating elements and, therefore, capable of being manufactured cheaply and handled by the home user with considerable ease, which possesses important advantages for use in a reproducing machine such as a home reproducer. A number of the film containing magazines may be readily stacked and stored and may be selected from an inspection of the title for playing purposes. The selected magazine may then be merely slid into position in the reproducer. In doing so, the driving element D enters the opening 54 of the magazine and engages the film at the guiding means G. The optical system O is then in position for transmitting light first into the magazine and thence through the film for optical-sound translation and reproduction thereof. In the form of the invention shown in Fig. 1, the optical mount 18 is first moved into position to render operative the optical system, while in the form of the invention shown in Fig. 5 this need not be done. In the operation of the machine the drive wheel D functions to propel the film in correct optical position in contact with the wheel, and the movement of the film from the supply to the take-up reel causes the desired film driving engagement between the guide means G and the driving wheel D. When the film run has been completed, the magazine is reversed in position for the playing of the other sound track or record, thus obviating the rewinding of the film.

In the modified form of the invention shown in Figs. 6 to 9 of the drawings, a different form of guiding means $G^2$ is employed in the magazine $M^2$, functioning, however, after the manner of the guiding means G, and reel braking means is associated therewith, operative to lock the reels against rotation when the magazine is not in use and to unlock the same for operation when the magazine is placed into the reproducer. Other features of improvement are also embodied in the magazine $M^2$. Otherwise this magazine is constructed along the principles of the magazine M above described.

Magazine $M^2$ of this modification comprises as before the top and bottom halves 128 and 130 with mounts 132 and 134 for the take-up and supply reels 136 and 138, respectively, the side wall 144 of the magazine being formed with the opening 156 for receiving the driving wheel $D^2$ and the end walls 140 and 142 being formed with the registering openings 156 and 158 for the purpose of permitting the light transmission of the optical system O. The take-up and supply reels in this case include spools 160 and 162 which are toothed or notched as at t, t at their upper and lower peripheries, the said spools being received by the cores 164 and 166 respectively.

The guiding means $G^2$ comprises the spaced pivoted elements 86 and 88 pivoted respectively on the pivot pins 90 and 92 and connected together by means of the spring 94. The pivoted element 86 carries the guide roller 96 and the pivoted element 88 carries the guide roller 98. The pivoted element 86 comprises a lever which is provided at its top with the extended arm 100 terminating in a locking tooth 102; and the pivoted element 88 similarly comprises a lever which is provided at its bottom with the extended arm 104 terminating in a locking tooth 106. This magazine is adapted to be slid into position in the reproducer on the slides or ways 108; and the frame 110 of the reproducer is provided with a stud 112 at one side thereof which, when the magazine is slid into operative position, engages one pivoted element or lever which is adjacent thereto as is clearly shown in Fig. 8 of the drawings. It will be understood that as shown in Fig. 8, the stud 112 engages the pivoted element or lever 86, and that when the magazine is reversed in position, the stud 112 will in like manner engage the other pivoted element or lever 88.

By means of this construction, the following operations take place: Normally the parts assume the position shown in Fig. 6 with the locking fingers 102 and 106 engaging the teeth t, t of the take-up and supply reels, thus locking these in position. When the magazine is slid into position in the reproducer, and the driving wheel $D^2$ enters the magazine for film engagement, the teeth 102 and 106 are moved to their unlocking positions as shown in Fig. 8 of the drawings, thus unbraking the reels. Tooth 102 is unlocked by reason of the engagement of the lever 86 by the stud 112 which stud enters the notch 114 in the magazine (see Fig. 6). The tooth 106 is moved to unlocking position by reason of the engagement of the roller 98 by the driving wheel $D^2$. By the stud engagement the lever 86 is moved counter-clockwise about its pivot as viewed in Fig. 8, and by the wheel engagement the lever 88 is moved about its pivot in a clockwise direction, thus disengaging both of the locking teeth. The stud engagement moves the lever 86 sufficiently far to avoid driving film engagement between the roller 96 and the driving wheel $D^2$. Movement of this lever 86 is transmitted through the spring 94 to tension the lever 88 so that its roller 98 contacts the film for driving engagement with the driving wheel $D^2$. When the magazine is reversed in position, the same action takes place as depicted in Fig. 8 of the drawings, the levers 86 and 88 and their associated parts being, however, reversed in position. In the normal position the connecting spring 94 acts on both of the levers to move and hold the same in their locking engagements with the film spools. It will be understood that the movement of the film in the direction as shown by the arrows in Fig. 8 assists the described action of the parts.

The sections of the film magazine are also preferably provided at the top and bottom walls thereof and at the opposite ends with the openings 116, 116 for exposing the film reel. The arrangement is such as shown in Fig. 6 of the drawings, that the user by feeling the film with his right hand may at once ascertain the correct position of the magazine to be placed into the machine, it being understood that the supply reel which is felt through the openings 116 should be at the right hand side as depicted in Fig. 6 of the drawings. The two sections of the film magazine may be secured together in locked position by a latching means such as the T-shaped bolt 118 supported and mounted for rotation in the lower half 130 of the magazine, the head of which is movable through a slot 120 in the upper half 128 of the magazine. When the bolt is moved to the position shown in Figs. 6 and 7 of the drawings, the sections are securely locked together; and these may be unlocked by moving the head of the bolt 90° to the position shown.

The film magazine of my present invention, the manner of making and using the same and the many advantages thereof particularly when used in a sound reproducer as described, will in the main be fully apparent from the above-detailed description thereof. It will be further apparent that many changes may be made in the construction thereof without departing from the spirit of the invention defined in the following claims.

I claim:

1. A photographic film magazine comprising a magazine casing having side walls and end walls, spaced mountings in the casing for receiving supply and take-up film reels, an opening in a side wall of the casing for receiving an external film driving element, guide means in the magazine for guiding the film in its movement from the supply reel to the take-up reel past said opening and in engagement with said film driving element, and means in an end wall of the casing for permitting light to be transmitted from an external source through said end wall into the casing to be reflected therein at an angle and then transmitted through the film, the said side wall opening and said driving element.

2. A photographic film magazine comprising a magazine casing having side walls and end walls, spaced mountings in the casing for receiving supply and take-up film reels, an opening in a side wall of the casing for receiving an external film driving element, guide means in the magazine for guiding the film in its movement from the supply reel to the take-up reel past said opening and in engagement with said film driving element, and an opening in an end wall of the casing for permitting light to be transmitted from an external source through said end wall into the casing to be reflected therein at right angles and then transmitted through the film, the said side wall opening and said driving element.

3. A reversible photographic film magazine comprising a magazine casing having side walls and end walls, spaced mountings in the casing for receiving supply and take-up film reels, an opening located centrally in a side wall of the casing for receiving an external film driving element, guide means in the magazine for guiding the film in its movement from either one of the reels to the other reel past said opening and in engagement with said film driving element, and means in the opposite end walls of the casing for permitting light to be transmitted from an external source through either of said end walls into the casing to be reflected therein at right angles and then transmitted through the film, the said side wall opening and said driving element.

4. A reversible photographic film magazine comprising a magazine casing having vertical side walls and horizontal end walls, spaced mountings in the casing for receiving supply and take-up film reels, an opening located centrally in a side wall of the casing for receiving an external film driving element, guide means in the magazine for guiding the film in its movement from one reel to the other reel past said opening and in engagement with said film driving element, and registering openings in the opposite end walls of the casing for permitting light to be transmitted from an external source through either of said end walls into the casing to be reflected therein at right angles and then transmitted through the film, the said side wall opening and said driving element.

5. The magazine of claim 1 in which a reflector is mounted in said casing for reflecting the light.

6. The magazine of claim 3 in which reflectors are mounted in said casing, one for each end wall, to reflect the light transmitted through either end wall towards the film.

7. A photographic film magazine comprising a magazine casing having side walls and end walls, spaced mountings in the casing for receiving supply and take-up film reels, an opening in a side wall of the casing for receiving an external film driving element, guide means in the magazine for guiding the film in its movement from the supply reel to the take-up reel past said opening and in engagement with said film driving element, means in an end wall of the casing for permitting light to be transmitted from an external source through said end wall into the casing to be reflected therein at an angle and then transmitted through the film, the said side wall opening and said driving element, the said guide means including guide rollers mounted on a movable member, said member being movable when the film is to be driven to cause one of the rollers to move towards said driving element for film driving engagement.

8. A reversible photographic film magazine comprising a magazine casing having vertical side walls and horizontal end walls, spaced mountings in the casing for receiving supply and take-up film reels, an opening located centrally in a side wall of the casing for receiving an external film driving element, guide means in the magazine for guiding the film in its movement from either one of the reels to the other reel past said opening and in engagement with said film driving element, means in the opposite end walls of the casing for permitting light to be transmitted from an external source through either of said end walls into the casing to be reflected therein at right angles and then transmitted through the film, the said side wall opening and said driving element, the said guide means including guide rollers mounted on a movable member, said member being movable when the film is to be driven in either direction of its motion to cause one of the rollers to move towards said driving element for film driving engagement.

9. A photographic film magazine comprising a magazine casing having side walls and end walls, spaced mountings in the casing for receiving supply and take-up film reels, an opening in a side wall of the casing for receiving an external film driving element, and guide means in the magazine for guiding the film in its movement from the supply reel to the take-up reel past said opening and in engagement with said film driving element, the said guide means including a member pivoted in said casing and guide rollers mounted on said member on opposite sides of the pivot, the said member being movable by the film to cause one of the rollers to move towards said driving element for film driving engagement.

10. A photographic film magazine comprising a magazine casing having side walls and end walls, spaced mountings in the casing for receiving supply and take-up film reels, an opening in a side wall of the casing for receiving an external film driving element, and guide means in the magazine for guiding the film in its movement from the supply reel to the take-up reel past said opening and in engagement with said film driving element, the said guide means including spaced and connected pivoted elements and guide rollers, one mounted on each pivoted element, one of said elements being movable to cause the roller on the other of said elements to move towards said driving element for film driving engagement.

11. A reversible photographic film magazine comprising a magazine casing having side walls and end walls, spaced mountings in the casing for receiving supply and take-up film reels, an opening in a side wall of the casing for receiving an external film driving element, and guide means in the magazine for guiding the film in its movement from the supply reel to the take-up reel past said opening and in engagement with said film driving element, the said guide means including spaced pivoted elements having a resilient connection therebetween and guide rollers, one mounted on each pivoted element, either of said pivoted elements being movable inwardly about its pivot to cause the other of said pivoted elements to move outwardly about its pivot to cause its roller to move towards said driving element for film driving engagement.

12. A photographic film magazine comprising a magazine casing having side walls and end walls, spaced mountings in the casing for receiving supply and take-up film reels, reel spools in said mountings, an opening in a side wall of the casing for receiving an external film driving element, and guide means in the magazine for guiding the film in its movement from the supply reel to the take-up reel past said opening and in engagement with said film driving element, the said guide means including spaced and connected pivoted elements and guide rollers, one mounted on each pivoted element, a locking finger extending from each element and normally engaging its contiguous reel spool to brake the same, one of said elements being movable to cause the roller on the other element to move towards said driving element for film driving engagement, and both of said elements being movable by the driving element engagement to cause the disengagement between the locking fingers and the reel spools.

FREEMAN H. OWENS.

REFERENCES CITED

The following references are of record in the file of this patent:

UNITED STATES PATENTS

| Number | Name | Date |
| --- | --- | --- |
| 1,935,210 | Hopkins | Nov. 14, 1933 |
| 2,216,909 | Foster | Oct. 8, 1940 |